June 8, 1937.                    W. RUNGE                    2,083,242
                         METHOD OF DIRECTION FINDING
                            Filed Jan. 28, 1935
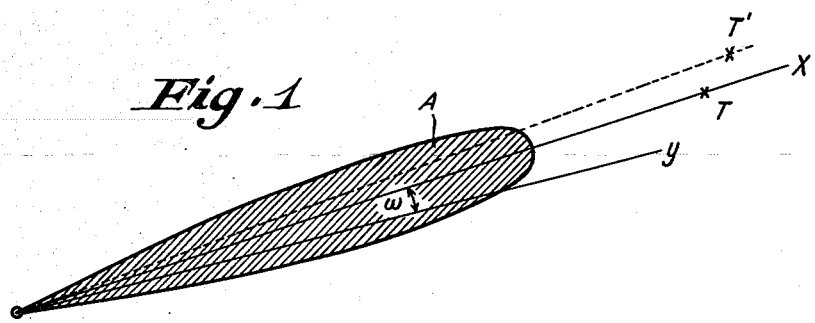
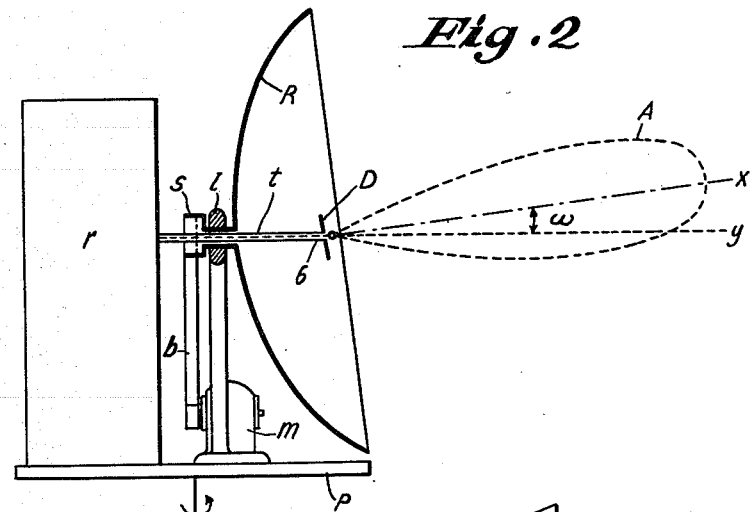
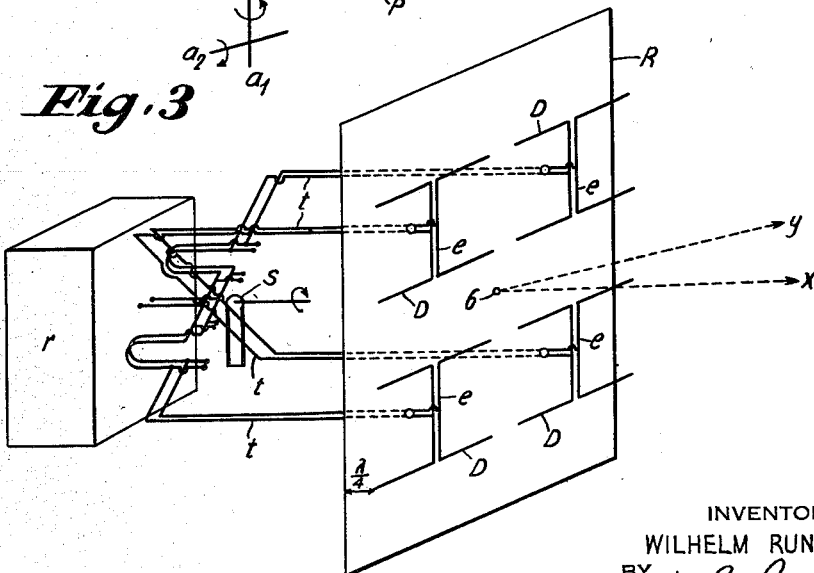
INVENTOR
WILHELM RUNGE
BY
ATTORNEY Patented June 8, 1937

2,083,242

UNITED STATES PATENT OFFICE 2,083,242

METHOD OF DIRECTION FINDING

Wilhelm Runge, Berlin, Germany, assignor to Telefunken Gesellschaft für Drahtlose Telegraphie m. b. H., Berlin, Germany, a corporation of Germany Application January 28, 1935, Serial No. 3,730
In Germany January 27, 1934

6 Claims. (Cl. 250—11)

(Granted under the provisions of sec. 14, act of March 2, 1927; 357 O. G. 5)

The present invention relates to radio direction finding and in particular to a method of direction finding within three dimensions of space.

With the direction finders as at present in use, the bearing is characterized by the orientation of the receiving system, which produces minimum signal intensity. This kind of direction finders hereinafter is called a "minimum direction finder" as distinguished from a "maximum direction finder", whereby the bearing is determined by the orientation of the receiving system for reception of maximum signal strength. One disadvantage of the minimum direction finders consists in the fact that the minimum position is apt to be made uncertain by the presence of stray signals, parasitic radiations and the like. Hence the indicator reading is caused to deviate from the true bearing. If the direction finder is equipped with sharp directional properties in order to eliminate the detrimental effect of the said parasitic radiations and is used as a maximum direction finder, one has to take into consideration the general defect of the maximum direction finders, that the bearing is flat, owing to the fact, that the differential quotient of the signal strength with respect to the orientation is nearly zero in the neighbourhood of the maximum reception. That means, the sensitivity of the signal strength to deviations from the true bearing is relatively small.

The present invention has for its object to increase the sharpness of the bearing obtained by a direction finder with a sharply directive wave collector. In accordance with the invention the overall-characteristic of the highly directive receiving aerial is made to rotate on an axis deviating by a small angle from the direction corresponding to maximum signal strength. One precaution is necessary, however, and that is to see that the polarization of the directive aerial is not substantially changed. The general features of the invention will be best understood by the following description when read in connection with the drawing in which Fig. 1 shows diagrammatically the directional effect of a receiving antenna constituted in accordance with the teachings of my invention;

Fig. 2 shows a vertical cross-sectional view of a receiving antenna in combination with a reflector, and means for variably orientating the directional effect of the combination three-dimensionally; and Fig. 3 shows diagrammatically a modification of my invention in which a variable orientation of the directional effect of the antenna system is obtained by electrical means.

In Fig. 1 the polar diagram of the receiving antenna is shown. The diagram exhibits the form of a sharply concentrated beam A having the maximum axis OX. This characteristic is made to rotate on an axis OY, which makes a small angle $\omega$ with the maximum axis OX. The methods of revolving the characteristic will be explained later. When the beam is rotating, the variation of the signal intensity depends upon the position of the transmitting station with respect to the rotation axis OY. For illustrative purposes, let it be assumed that the cross section of the beam is circular and the transmitting station T is located accurately on the rotation axis OY. The signal strength does not depend on the rotation at all. If the transmitting station T', however, is disposed aside the rotation axis OY in any direction, the reception will fluctuate and become loudest, when the maximum axis OX approaches the straight path between the origin point O and the transmitting station T' (dashed line in Fig. 1). To take a bearing, the operator tunes in the required station and moves the receiving aerial until the rotation axis OY takes a position such that the signal strength remains constant while revolving the directive characteristic OX on the rotation axis OY. Then the transmitting station is located on the line OY.

Rotation of the directional characteristic may be obtained in different ways, by mechanical means as well as by electrical. Fig. 2 shows, partly in section, a receiving apparatus employing the invention. R designates a parabolic reflector, in the focus of which a dipole antenna D is located. A represents the polar diagram of the wave collecting system, the maximum axis of which is determined by OX. A transmission line $t$ connects the dipole antenna D to the receiver $r$. The mirror R is pivoted on a bearing $l$ and is provided with a pulley $s$. The reflector is continually revolved at constant speed by means of a belt drive $b$ and an electromotor $m$. All the parts are assembled on a mounting plate $p$, which may be revolved on the vertical axis $a_1$ and the horizontal axis $a_2$, e. g. by hand wheels. The angular position may be noted from dials or circular scales joined to the respective axes. The operator has to move the apparatus, until the signal strength remains constant. It may be noted, that the rotation axis OY and the maximum vector OX include a small angle $\omega$.

Fig. 3 shows another embodiment of the invention. R designates a plane metal sheet, serving as reflector, in front of which four groups of dipole antennas D are fixed. The dipoles of each group are interconnected by parallel wires $e$. The wave energy collected by the dipole groups is led to the receiver $r$ over transmission lines $t$. If the arrangement is symmetrical, the vector of maximum receiving intensity is perpendicular to the reflector plane R. The directional characteristic may be made to rotate on a diverging axis OY by cyclically varying the effective length of certain transmission lines $t$. This may be accomplished by short circuiting a part of the respective line by means of a rotating switch S.

It will be apparent that the invention is not restricted to the physical construction illustrated in the drawing but that various changes may be made, without departing from the spirit of the invention.

What is claimed, is:

1. In a direction finder, an ultra-short wave receiving antenna, means including a metallic reflector for rendering said antenna sharply directional, means for orienting the axis of general directivity of said antenna and its reflector into any desired position of aim, and means for causing the sharply directional axis of said antenna and its reflector to be rotated continuously in such manner that it circumscribes the surface of a cone whose axis is coincident with said axis of general directivity.

2. In a direction finding system, a radiant energy collecting device comprising antenna elements and a reflector which in combination possess sharply directive receiving properties, means for orienting the axis of said directive properties three-dimensionally, means for producing cyclic repetitions of orientation in a given direction, and means including receiving apparatus connected to said energy collecting device for indicating variations in the signal strength of radiant energy received during a cycle of operation of said orienting means.

3. Apparatus in accordance with claim 2 and further characterized in that said reflector is in the form of a substantially flat surface.

4. Apparatus in accordance with claim 2 and further characterized in that said antenna elements comprise a plurality of dipoles.

5. Apparatus in accordance with claim 2 and further characterized in that a plurality of transmission lines is provided for connecting said receiving apparatus to different portions of said energy collecting device, and means are provided for cyclicly short-circuiting different pairs of said transmission lines, thereby to effect a rotation of the directive axis of said energy collecting device about an imaginary conical surface.

6. In a direction finding receiver, a radiant energy collecting device comprising a plurality of groups of antenna elements, each group comprising interconnected dipoles, means including a substantially flat metal sheet suitably disposed in respect to said energy collecting device to give the latter a sharply directive receiving characteristic, apparatus for indicating that direction of orientation of said energy collecting device which provides a maximum response to received signaling energy, means including transmission wires for transferring energy from said dipoles to said indicating apparatus, and means for cyclically varying the effective length of different pairs of said transmission wires, thereby to produce a rotationally variable orientation of the directive axis of said energy collecting device about an imaginary conical surface.

WILHELM RUNGE.